(12) United States Patent
Huang

(10) Patent No.: US 7,429,121 B1
(45) Date of Patent: Sep. 30, 2008

(54) AUTOMOBILE MULTIFUNCTION AUXILIARY LAMP

(76) Inventor: Yao-Hung Huang, No. 19, Lane 685, Xiaodong Rd., Yongkang City, Tainan County 710 (TW)

( * ) Notice: Subject to any disclaimer, the term of this patent is extended or adjusted under 35 U.S.C. 154(b) by 0 days.

(21) Appl. No.: 11/944,440

(22) Filed: Nov. 22, 2007

(51) Int. Cl.
*B60Q 1/00* (2006.01)

(52) U.S. Cl. .................. 362/485; 362/183; 362/202; 362/505; 362/540; 362/541; 340/431; 340/479

(58) Field of Classification Search .......... 362/183, 362/202–206, 485, 505, 540–542, 800; 340/431, 340/479

See application file for complete search history.

(56) References Cited

U.S. PATENT DOCUMENTS 4,800,471 A * 1/1989 Lippert ................. 362/485
6,302,567 B1 * 10/2001 Gamble, Sr. ........... 362/505

* cited by examiner

*Primary Examiner*—Stephen F Husar
(74) *Attorney, Agent, or Firm*—Ming Chow; Sinorica, LLC

(57) ABSTRACT

An automobile auxiliary lamp includes a lamp and a connector. The connector is installed at a proper location of an automobile and connected with the terminals of related control devices of the automobile for receiving electricity supplied by the automobile, and the lamp is engaged with the connector. When a user operates a related control device of the automobile, the lamp will synchronously be triggered through a control connecting line to function and emit light, able to enhance warning effect of the automobile lamp. In addition, the auxiliary lamp can also be removed from the automobile to be independently used as a common illuminating lamp, enabling a user to use the lamp for various purposes.

10 Claims, 5 Drawing Sheets

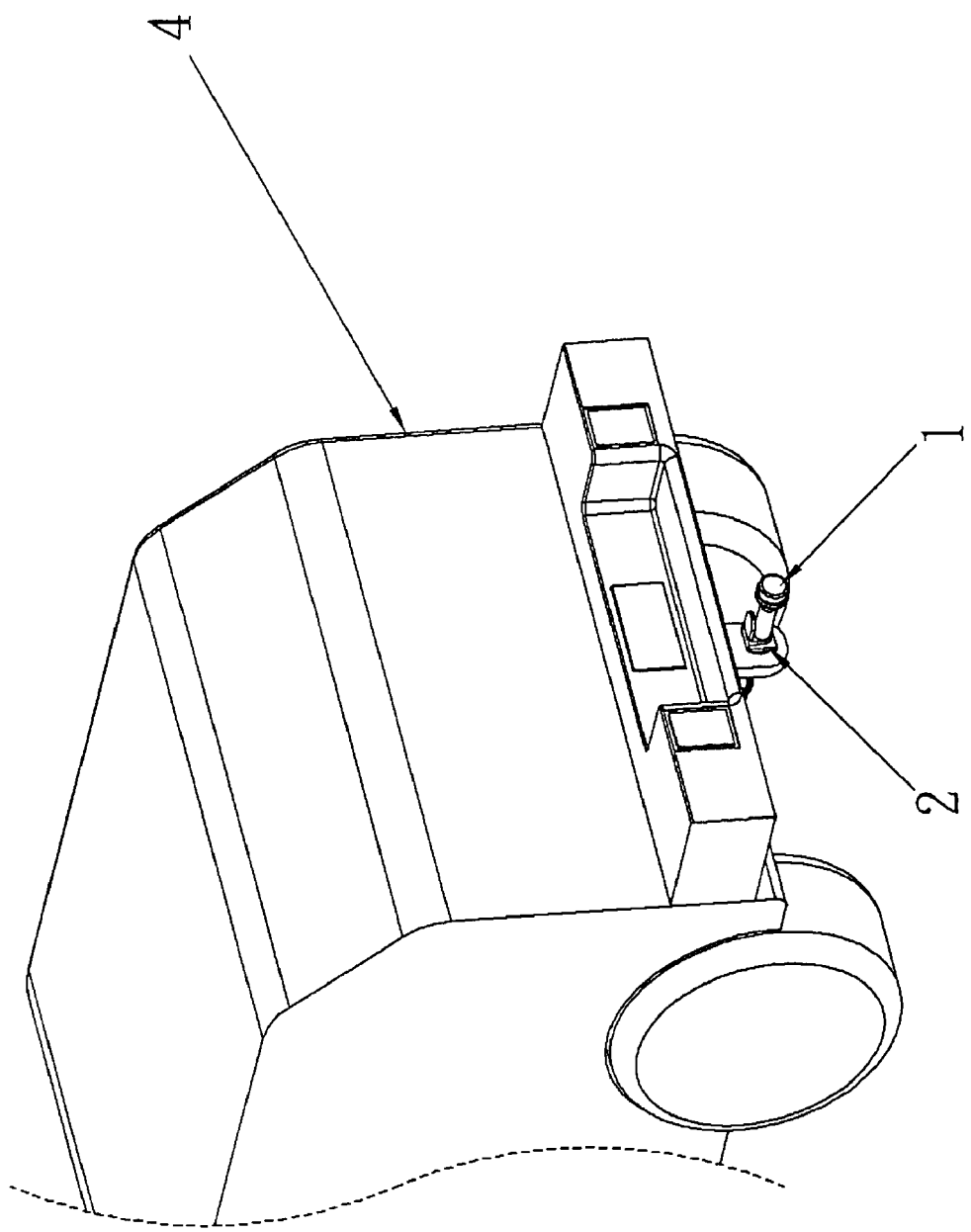

AUTOMOBILE MULTIFUNCTION AUXILIARY LAMP

BACKGROUND OF THE INVENTION

1. Field of the Invention

This invention relates to an automobile multifunction auxiliary lamp, particularly to one able to be installed on an automobile for assisting lighting or removed from the automobile to be independently used as a common lamp.

2. Description of the Prior Art

As commonly known, automobile lamps are used for lighting and safety warning. When a driver encounters an unexpected situation and wants to perform emergency braking, or when a driver wants to carry out reversing, a warning light given out only by the automobile lamp cannot properly and clearly be recognized by the drivers of other automobiles. Thus, it is likely to result in accidents and affect driving safety if the driver is negligent in driving speeds or careless of the situation of the surroundings around.

Although some lamps on the market can be assembled on the outer side of an automobile, yet such lamps are threadably secured on the automobile, taking much labor in assembling. In addition, such a lamp has only one single warning function and cannot be used for other purposes, lacking of additional value.

SUMMARY OF THE INVENTION

The objective of this invention is to offer an automobile multifunction auxiliary lamp including a lamp and a connector. The connector is installed at a proper location of an automobile (at a rear side, for instance) and connected with the terminals of a related control device of the automobile for receiving electricity supplied by the automobile, and the lamp is engaged with the connector. Thus, when a user operates the automobile control device, the lamp will be triggered through a control connecting line to emit light, simple in assembling and able to elevate warning effect of the automobile lamp. In addition, the lamp can be removed from the automobile to be independently used as a common illuminating lamp, enabling a user to employ the lamp for various purposes.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
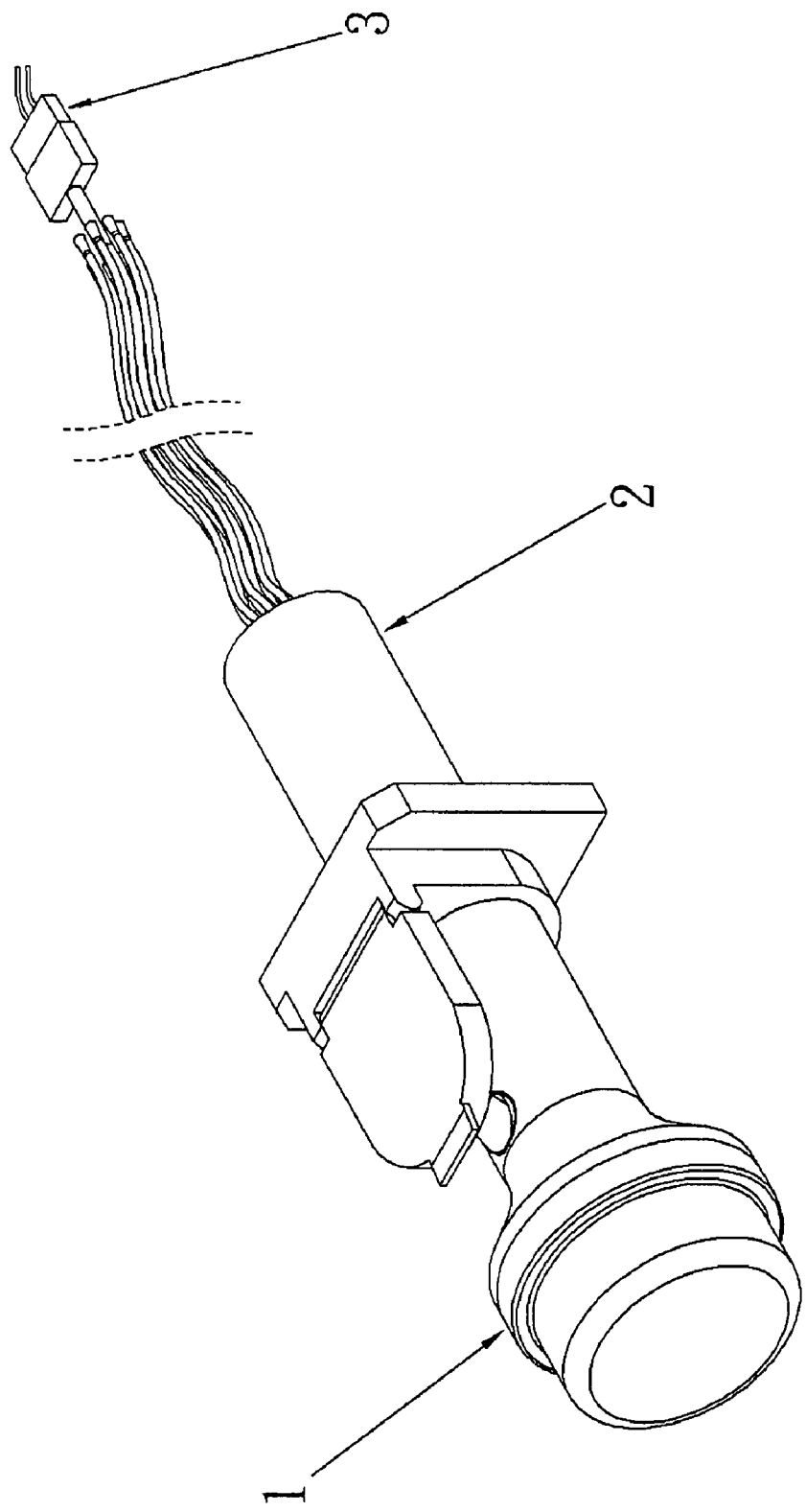
FIG. 1 is an exploded perspective view of a first embodiment of the lamp body of an automobile multifunction auxiliary lamp in the present invention.
Figure 2:
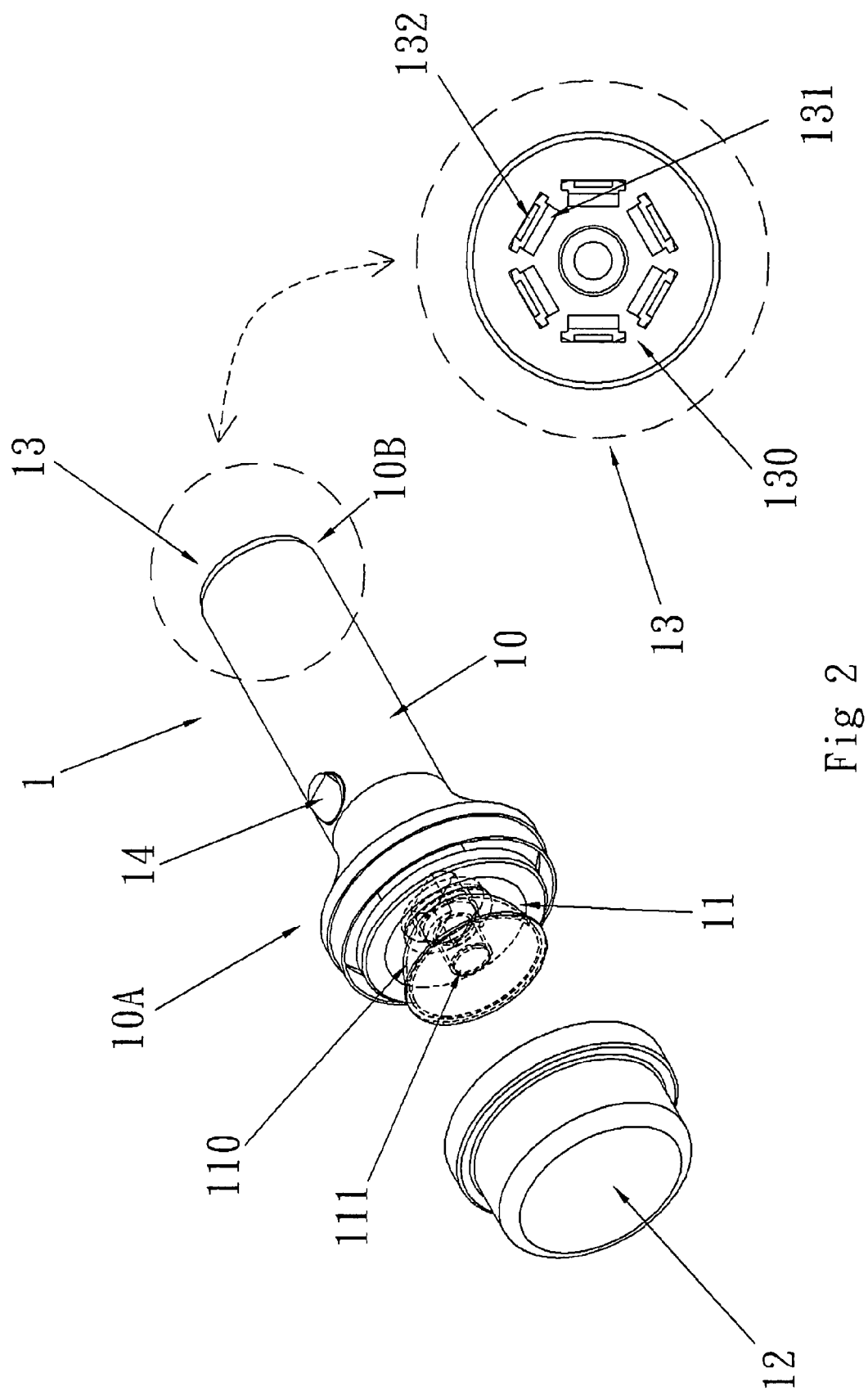
FIG. 2 is a perspective view of the first embodiment of the connector of the automobile multifunction auxiliary lamp in the present invention.

A first preferred embodiment of an automobile multifunction auxiliary lamp in the present invention, as shown in FIGS. 1 and 2, includes a lamp 1 and a connector 2 as main components combined together.

The lamp 1 is provided with a cylindrical main body 10 made of nylon. The lamp main body 10 has its first end (10A) disposed with an opening larger than the cross-sectional area of the lamp main body 10, letting the lamp main body 10 shaped as a trumpet. A light source unit 11 for emitting light is installed at the first end (10A) of the lamp main body 10, having a transparent shade 12 mounted on a light emitting portion for covering and protecting the light source unit 11. The lamp main body 10 further has its second end (10B) provided with a power source socket 13 and its outer side disposed with a control switch 14, having a power source control circuit and an electrical storage device installed in the interior for starting the light source unit 11 and for reserving electricity. The power source control circuit is connected with the power source socket 13 by an electric line for receiving electricity supplied by the automobile and also connected to the control switch 14 outside the lamp main body 10 by an electric line for controlling the lamp 1 to function when the lamp 1 is employed independently. The light source unit 11 is provided with a lamp-stand 110 with a concave wide-angle mirror surface, having a luminous member 111, such as a lamp bulb or an LED, installed in the center of the lamp-stand 110. The power source socket 13 is secured with a seat 130 bored with a plurality of insert holes 131, with metal conducting strips 132 respectively fixed in proper insert holes 131 for contacting and supplying the power source control circuit inside the lamp main body 10 with electricity.

The connector 2 for receiving the lamp 1 is composed of a swan socket 21 and a connecting line unit 20 consisting of a power source connecting line 200 and plural control connecting lines 201. The power source connecting line 200 has one end combined with an adapter 2000 to be connected with an electricity supply socket 3 connected outward from an automobile, while the control connecting lines 201 are respectively connected to the terminals of a related control device of the automobile, such as a foot brake or a directional lamp. The swan socket 21 is disposed thereon with metallic engage strips 210 preset in number tallying with the number of the power source connecting line 200 and the control connecting lines 201 of the connecting line unit 20. The engage strips 210 of the swan socket 21 are respectively connected with the connecting lines of the connecting line unit 20 so that, when the swan socket 21 is connected with the power source socket 13 of the lamp 1, the engage strips 210 of the swan socket 21 can transmit electricity supplied by the automobile to the lamp 1. Further, the swan socket 21 is assembled thereon with a cover 22 to be covered on the swan socket 21 for protecting the engage strips 210 from being soiled when the connector 2 is unused.

Figure 3:
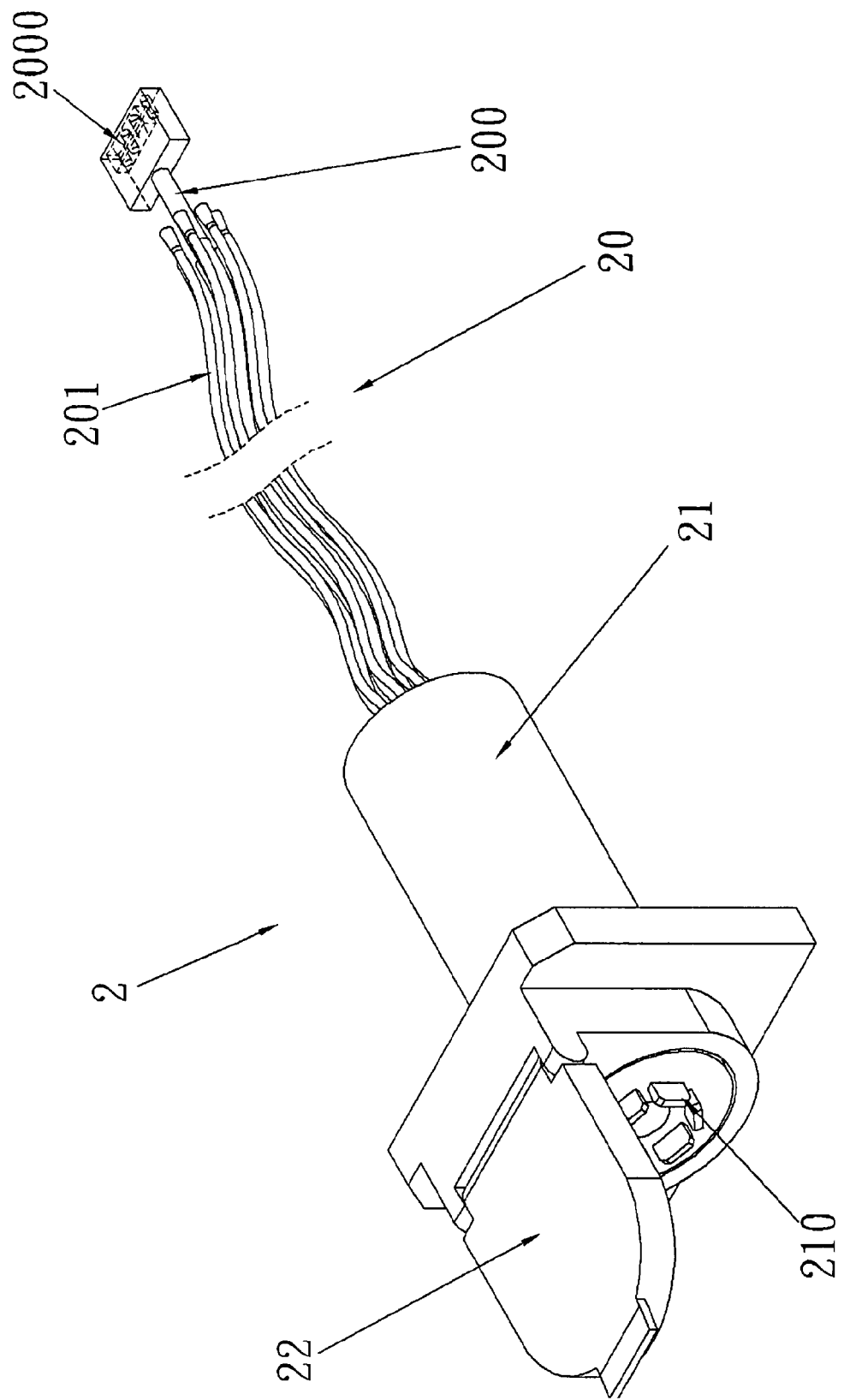
FIG. 3 is a perspective view of the first embodiment of the automobile multifunction auxiliary lamp in the present invention.

In assembling, as shown in FIG. 3, firstly, the connector 2 is installed at a proper location of the rear end of an automobile, and the adapter 2000 of the power source connecting lines 200 of the connecting line unit 20 are connected with the power supply socket 3 connected outward from the automobile engine and the control connecting lines 201 of the connecting line unit 20 are respectively connected with the terminals of the related control device of the automobile, such as a foot brake. Next, open the cover 22 of the swan socket 21 of the connector 2 and have the insert holes 131 of the power source socket 13 at the rear end of the lamp 1 respectively aligned to the engage strips 210 of the swan socket 21 of the connector 2 to let the engage strips 210 respectively inserted in the insert holes 131 and contact with the conducting strips 132 for transmitting electricity supplied by the automobile power supply socket 3 to the lamp 1, thus finishing assembling of the automobile auxiliary lamp. The foresaid power source socket 13 of the lamp 1 and the swan socket 21 of the connector 2 are pluggable and detachable in specifications, able to be assembled or disassembled directly and quickly.

When a driver puts on the foot brake, the control connecting line 201 will be actuated to trigger the power source control circuit inside the lamp main body 10 to function to let the lamp 1 give out warning light. In addition, the power source control circuits inside the lamp main body 10 can be designed differently to let the lamp 1 give out flashing light or non-flashing light in accordance with a user's need.

Moreover, when the lamp 1 is combined with the connector 2, electricity supplied by the automobile power supply socket 3 can be stored by the electrical storage device inside the lamp main body 10. Thus, when the automobile auxiliary lamp is needless, the lamp 1 can be removed from the automobile to be independently used as a common illuminating lamp like a flashlight.

Figure 4:
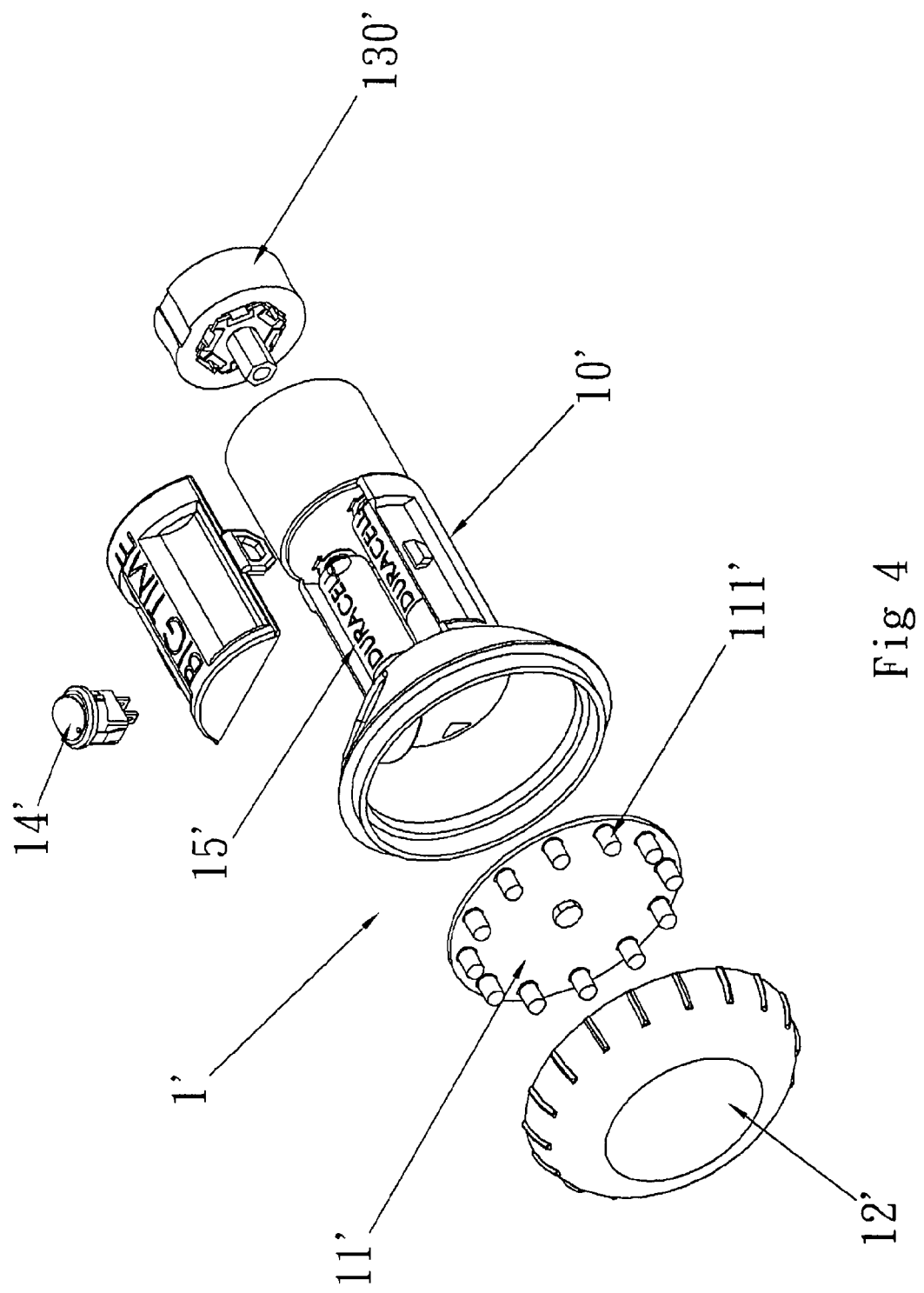
FIG. 4 is an exploded perspective view of a second embodiment of an automobile multi-function auxiliary lamp in the present invention; and, FIG. 5 is a perspective view of the first embodiment of the automobile multi-function auxiliary lamp fixed on the back of an automobile in the present invention.

Next, FIG. 4 shows a second preferred embodiment of an automobile multi-function auxiliary lamp, having the equivalent function as the first one shown in FIG. 2. The second preferred embodiment includes a main body 10', a light source unit 11', a base 130', a control switch 14', and a battery unit 15'.

The light source unit 11' has a luminous member 111' using a light emitting diode, and the battery unit 15' has a battery.

As can be understood from the above description, this invention has the following advantages.

1. The auxiliary lamp is installed at a proper location of an automobile (at a rear end, for instance) for emitting warning light when a driver steps on the brake or other operation, enhancing warning effect and enabling other automobiles to recognize the warning light and react properly, and thus effectively elevating driving safety.

2. The sockets of both the lamp and the connector are pluggable and detachable, easy to be assembled on or disassembled from an automobile.

3. The auxiliary lamp of this invention is designed to emit various kinds of light, and it not only can be used as an automobile auxiliary lamp, but also can be removed from the automobile and independently used as a common illuminating lamp, having multifunction and high additional value.

While the preferred embodiment of the invention has been described above, it will be recognized and understood that various modifications may be made therein and the appended claims are intended to cover all such modifications that may fall within the spirit and scope of the invention.

I claim:

1. An automobile multifunction auxiliary lamp comprising a lamp and a connector:

said lamp formed with a cylindrical lamp main body, said lamp main body having its first end provided with a light source unit and its second end disposed with a power source socket, said power source socket fixed with a seat bored with a plurality of insert holes, said insert holes respectively fixed therein with a conducting strip, said lamp main body having its outer side installed with a control switch and its interior disposed with a power source control circuit connected with said power source socket and a said control switch:

said connector composed of a swan socket and a connecting line unit, said connecting line unit composed of a power source connecting line and plural control connecting lines, said swan socket formed thereon with engage strips preset in number matching with number of connecting lines of said connecting line unit, said engage strips connected with said connecting line unit: and said connector assembled at a proper location of an automobile for receiving electricity supplied by the automobile through said power source connecting line, said control connecting lines of said connector connected with terminals of related control devices of the automobile, and said lamp engaged with said connector, said lamp triggered to function and emit warning light when a user operates said control devices of the automobile.

2. The automobile multifunction auxiliary lamp as claimed in claim 1, wherein said light source unit is provided with a lamp-stand having a lamp bulb installed in the center.

3. The automobile multifunction auxiliary lamp as claimed in claim 1, wherein said light source unit is provided with a lamp-stand installed with an LED in the center.

4. The automobile multifunction auxiliary lamp as claimed in claim 2 or 3, wherein said lamp-stand is formed with a concave wide-angle mirror surface.

5. The automobile multifunction auxiliary lamp as claimed in claim 1, wherein said light source unit has a transparent cover mounted on a light emitting portion.

6. The automobile multifunction auxiliary lamp as claimed in claim 1, wherein said swan socket is assembled thereon with a cover.

7. The automobile multifunction auxiliary lamp as claimed in claim 1, wherein said lamp main body is installed with an electrical storage device in the interior for storing electricity supplied by the automobile.

8. The automobile multifunction auxiliary lamp as claimed in claim 7, wherein said lamp can independently be used as a common illuminating lamp.

9. The automobile multifunction auxiliary lamp as claimed in claim 1, wherein said lamp is able to emit non-flashing light.

10. The automobile multifunction auxiliary lamp as claimed in claim 1, wherein said lamp is able to emit flashing light.

* * * * *